United States Patent Office 3,840,506
Patented Oct. 8, 1974

3,840,506
BIS(NITRILE OXIDE) CROSSLINKING OF SATURATED NITRILE POLYMERS
John W. Collette and James E. Nottke, Wilmington, Del., assignors to E. I. du Pont de Nemours and Company, Wilmington, Del.
No Drawing. Filed July 20, 1972, Ser. No. 273,354
Int. Cl. C08f 3/74, 3/76
U.S. Cl. 260—85.5 S             10 Claims

ABSTRACT OF THE DISCLOSURE

Disclosed herein are crosslinked, saturated, polymers containing 1,2,4-oxadiazole crosslinking units therein, and process therefor comprising reacting a bis(nitrile oxide) with polymers containing pendant nitrile groups.

BACKGROUND OF THE INVENTION

1. Field of the Invention

This invention relates to 1,2,4-oxadiazole crosslinked, saturated, polymers.

2. Description of the Prior Art

It has not been known, heretofore, to apply the reaction of a bis(nitrile oxide) with a nitrile substituent in an existing polymer chain to obtain crosslinking of the polymer by way of formation of 1,2,4-oxadiazole crosslinking units.

SUMMARY OF THE INVENTION

Product

The novel crosslinked polymers of this invention can be represented by the structure

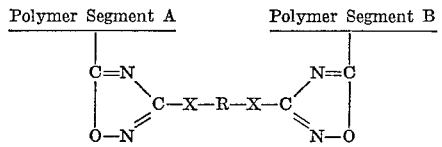

wherein R is alkylene, cycloalkylene, arylene, aralkylene, alkarylene, alkylene-diarylene, cycloalkylene - dialkylene, arylene-dialkylene, alkylene-oxy-alkylene, arylene - oxy-arylene, alkylene-oxy-arylene, alkarylene - oxy - arylene, alkarylene-oxy-alkarylene, and the corresponding thio and sulfonyl analogs, X is zero,

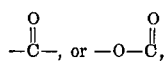

Polymer Segments A and B can be alike or different, each has a molecular weight of about 5,000 to 2,000,000, each has at least three 1,2,4-oxadiazole crosslinking attachments thereto, and each contains from 5 to 100 weight percent of one or more polymers derived from the monomer $$R^1R^3C=C(R^2)CN$$

wherein $R^1$, $R^2$ and $R^3$ can be hydrogen; alkyl, alkoxy and alkylthio of 1 to 8 carbon atoms; alkoxycarbonyl of 2 to 8 carbon atoms; aryl and aryloxy of 6 to 12 carbons, acyloxy of 2 to 8 carbons; haloalkyl and cyanoalkyl up to 6 carbons; halogen, cyano, nitro, and hydroxymethyl.

Process

The novel process comprises reacting a substantially linear polymer, free of carbon-carbon unsaturation, which contains pendant nitrile groups, with a bis(nitrile oxide) to effect an addition reaction between the nitrile groups and the nitrile oxide groups to provide the novel 1,2,4-oxadiazole-containing crosslinked polymers. Alternatively, the nitrile-containing polymer may be mixed with a bis (nitrile oxide) precursor, a bis(hydroxamoyl chloride), and the mixture exposed to a base such as a tertiary amine, to convert the bis(hydroxamoyl chloride) to the corresponding bis(nitrile oxide) in situ. Crosslinking of the polymer chains is effected by the immediately generated bis(nitrile oxide). The terms polymers and copolymers employed herein have their broadest meanings and are meant to include copolymers, terpolymers, etc.

Reaction temperatures are between about 40° C. to 175° C. Preferred temperatures are between about 50° C. to 160° C. The bis(nitrile oxide) reactant can be bis (nitrile oxide) or precursor(s) therefor. For the sake of brevity, the bis(nitrile oxide) and its precursors(s) may sometimes be spoken of as nitrile oxide source(s).

The amount of bis(nitrile oxide) or precursor should be such as to produce between about 0.5 to 30 weight percent bis(nitrile oxide), based on the weight of the polymer. Preferred amounts of bis(nitrile oxide) are between about 1 to 15%. Generally, crosslinking is complete in less than 2 hours.

DETAILS OF THE INVENTION

The Crosslinked Polymers

The saturated polymers crosslinkable as described herein are those containing pendant nitrile groups attached to the main polymer chain as well as those containing nitrile groups attached to aliphatic or aromatic carbon of polymer sidechains.

Examples of polymers containing nitrile groups on the main chain are addition polymers prepared by homo- or copolymerization of vinyl, vinylidene or vinylene monomers which contain nitrile groups attached to olefinic carbon. Such monomers include substituted acrylonitriles, $$R^1R^3C=C(R^2)CN$$

wherein $R^1$, $R^2$ and $R^3$ can be hydrogen; alkyl, alkoxy and alkylthio of 1 to 8 carbon atoms; alkoxycarbonyl of 2 to 8 carbon atoms; aryl and aryloxy of 6 to 12 carbons, acyloxy of 2 to 8 carbons; haloalkyl and cyanoalkyl up to 6 carbons; halogen, cyano, nitro, and hydroxymethyl. Preferred substituents are hydrogen, halogen, alkyl, alkoxycarbonyl and acyloxy.

Specific compounds include acrylonitrile, 2-alkylacrylonitriles including the 2-methyl, 2-ethyl, 2-n-propyl, 2-neopentyl, and 2-hexyl derivatives, 3-methylacrylonitriles, 2-trifluoromethylacrylonitrile, 2-difluoromethylacrylonitrile, 2 - cyanoethylacrylonitrile (2 - methyleneglutaronitrile), 3-cyanoethylacrylonitrile (1,4 - dicyanobutene-1), 2-cyanoacrylonitrile (vinylidene cyanide), cis- and trans - 3 - cyanoacrylonitrile, 2 - carbomethoxyacrylonitrile, 2-carboethoxy- and 2-carbobutoxy- acrylonitrile, 2-phenyl- and 3-phenylacrylonitrile, 2-chloro-, 2-bromo-, and 2-fluoroacrylonitrile, perfluoroacrylonitrile, perfluoro-2-methylacrylonitrile, cis- and trans-3-chloroacrylonitrile, 2-ethoxy- and 3-ethoxyacrylonitrile, 3-methoxyacrylonitrile, 3 - phenoxyacrylonitrile, 2 - acetoxyacrylonitrile, 2-butylyloxyacrylonitrile, 3-nitroacrylonitrile, 2-hydroxymethylacrylonitrile.

Reaction of homo- or copolymers of substituted acrylonitriles with a bis(nitrile oxide) as taught herein can proceed as follows in one typical depiction

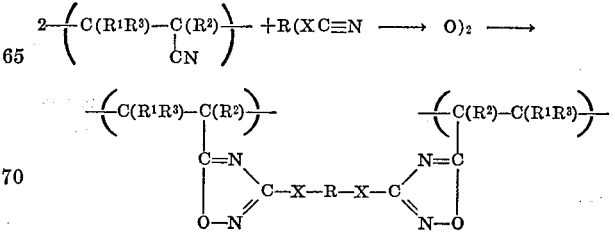

Copolymerization of nitrile-containing monomers are known with a wide variety of comonomers to obtain copolymers with pendant nitrile groups suitable for crosslinking by the process of this invention. Preferred comonomers include styrene and alkyl- and halo-substituted styrenes, α-methylstyrene, alkyl esters of acrylic and methacrylic acid, vinyl acetate and vinyl esters of saturated aliphatic and aromatic carboxylic acids, vinyl chloride, ethylene, propylene, maleic anhydride, acrylic acid, acrolein, ethyl vinyl ether and other alkyl vinyl ethers, methacrylic acid, methacrolein, 2-vinylpyridine, N-vinylsuccinimide and other N-vinylimides. Equally preferred are fluorinated comonomers including vinyl fluoride, vinylidene fluoride, tetrafluoroethylene, hexafluoropropylene and perfluoroalkylvinyl ethers, $$CF_2=CFOR_f$$

where $R_f$ is perfluoroalkyl of 1–3 carbon atoms.

Specific comonomers include acrolein, methacrolein, 2-acetoxyacrylonitrile, acrylic and methacrylic acids, alkyl esters of acrylic acid and methacrylic acid with up to 18 carbons in the alkyl group including the methyl, ethyl, butyl, i-butyl, hexyl, n-dodecyl and octadecyl esters, ethylene, 2-methylacrylonitrile, styrene, o-, m- and p-methylstyrene, α-methylstyrene, N-methylolacrylamide, 2-nitrobutylacrylate, potassium and sodium styrenesulfonate, sodium acrylate, sodium methacrylate, vinyl esters of saturated fatty acids ($C_2$–$C_{18}$ range) including vinyl acetate, vinyl butyrate, vinyl caproate, vinyl benzoate, vinyl chloride and vinyl fluoride, vinylidene chloride and vinylidene fluoride, 2-vinylpyridine and N-vinylsuccinimide.

Preferred polymer systems are (crosslinked) homopolymers of acrylonitrile and copolymers of acrylonitrile with the monomers disclosed above. Also preferred are homopolymers of 2-methacrylonitrile and 2-carboalkoxyacrylonitriles containing alkyl groups of 1–6 carbon atoms, and copolymers thereof with the above-disclosed comonomers. The acrylonitrile homo- and copolymers are especially preferred.

The Bis(Nitrile Oxides) and Precursors Therefor

Bis(nitrile oxides) suitable for use as crosslinking agents for nitrile-containing polymers have the general formula $$R(C\equiv N\rightarrow O)_2$$

where R is as heretofore defined.

Suitable bis(nitrile oxides) are those in which R is 1,4-phenylene, 1,3-phenylene, methylene, ethylene, tetramethylene, octamethylene, cyclohexylene, cyclooctylene, phenylethylene, methylphenylene, xylylene, methylenediphenylene, cyclohexylenedimethylene, ethylene - oxyethylene, tetramethylene-oxy-ethylene, methylphenyleneoxy-phenylene, phenylene-oxy-phenylene, ethylphenyleneoxy-ethylphenylene, ethylene - oxy - phenylene, ethylene-thio-ethylene, phenylene-thio-phenylene, ethylene - thiophenylene, ethylene - sulfonyl - ethylene, phenylenesulfonyl-phenylene and ethylene-sulfonyl-phenylene.

One skilled in the art would know from this disclosure that the crosslinking reaction takes place as disclosed regardless of the particular value of R as herein defined in the bis(nitrile oxide), since the crosslinking reaction involves only the nitrile oxide groups of the bis(nitrile oxide).

Bis(difunctional nitrile oxides) are also suitable for crosslinking nitrile-containing polymers, said oxides having the formula(s)

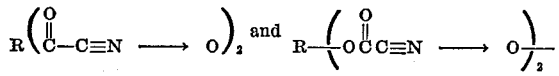

where R has the values disclosed above.

Preferred bis(nitrile oxides) are those where R has the values, 1,4 - phenylene(terephthalonitrile bis(N-oxide)), and 1,3-phenylene(isophthalonitrile bis(N-oxide)).

Bis(hydroxamoyl chlorides) can be employed as reactants which are precursors for the bis(nitrile oxides). They will have one of the structures

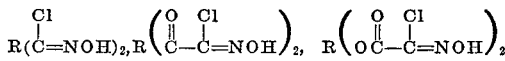

wherein R has the values disclosed above. The bis(hydroxamoyl chlorides) can be converted to the corresponding bis(nitrile oxide) in situ, either thermally or in the presence of a base, and the formed bis(nitrile oxide) effects crosslinking of the polymer. Suitable bases include primary, secondary and tertiary amines, $R'_l NH_{3-l}$, where $l$ is an integer from 1–3, inclusive, and the R' groups, alike or different, are alkyl of up to 8 carbon atoms. Also included are alkail and alkaline earth metal carbonates, hydroxides, alkoxides and carboxylates of alkyl aliphatic acids of up to 8 carbons.

The bis(nitrile oxides) of this invention can be prepared as described in the art from the corresponding dialdehyde by treatment with hydroxylamine to convert the aldehyde groups to oximes, followed by chlorination with NOCl or $Cl_2$ to obtain the corresponding bis(hydroxamoyl chloride). Subsequent treatment of the latter with a base such as tirethylamine, readily gives the desired bis(nitrile oxide). Other methods of preparation suitable for use are those described in U.S. 3,454,506.

The desired bis(nitrile oxide) reactant can be obtained, alternatively, by adding a base precursor such as N,N-dimethyl-N'-p-chlorophenylurea to the polymer and bis(hydroxamoyl chloride). In this manner, base is generated at elevated temperatures of about 140° C. and above. The substituted urea is thermally converted to dimethylamine at their higher temperatures, and the bis(hydroxamoyl chloride) converted to the desired bis(nitrile oxide) by the released dimethylamine. See Examples 3 and 4. Alternatively, the bis(hydroxamoyl chloride) can be converted to the bis(nitrile oxide) by heat alone at temperatures above about 160° C.

Best results are achieved when the polymer and nitrile oxide source are well mixed. Mixing can be effected by use of a solvent for the polymer and nitrile oxide source, and crosslinking effected by heating in which case the crosslinked polymer separates from solution. Alternatively, the solvent may be removed before crosslinking is effected.

Use of a solvent is not necessary and the nitrile oxide source can be blended with the polymer by any of the usual polymer blending methods known in the art, and crosslinking effected by heating the resulting blend. The dry-blending method is particularly suitable when a nitrile oxide precursor is used since higher temperatures can be employed in the blending operation without crosslinking the polymer.

In addition to the principal ingredients, other polymer additives may be incorporated to further modify the properties of the final crosslinked polymer. Typical additives are fillers such as carbon black, titanium dioxide, magnesium oxide, talc, etc.; extenders, plasticizers, stabilizers, antioxidants, pigments and the like.

The uses to which the novel thermally- and hydrolytically stable crosslinked polymers can be put and the manner of their use will be obvious to those skilled in the art. Since crosslinking confers upon the polymers significantly improved solvent resistance and thermal stability, they find applications in systems exposed to hydrocarbon oils and greases, and in nitrile-containing fibers. Additionally, the improvement in compression set obtainable by use of the novel crosslinking systems finds particular application in vulcanized nitrile-containing elastomers.

For example, films of acrylonitrile/methyl acrylate (90/10 weight ratio) copolymers after crosslinking with terephthalonitrile bis(N-oxide) are useful as insoluble semipermeable membranes in water purification by reverse osmosis. Similarly a solution of the same copolymer in dimethylformamide containing terephthalaldehyde bis (chlorooxime) (2 weight percent based on copolymer) can be spun through an orifice into water, the uncrosslinked fibers exposed at 90° C. to ammonia vapor and drawn to give a crosslinked fiber with improved physical properties, i.e., increased tensile strength and reduced elongation. Highly fluorinated nitrile-containing elastomers after crosslinking with bis(nitrile oxides) find use where extreme temperature and solvent resistance are required, for example, in oil well seals, O-rings and high temperature gaskets.

DESCRIPTION OF THE PREFERRED EMBODIMENTS

The following examples are meant to illustrate but not to limit the scope of this invention. Several chemical compounds and abbreviations therefor that are employed in these Examples: dimethylformamide, (DMF); terephthalonitrile bis(N-oxide), TNO; terephthalaldehyde bis(chlorooxime), TCO.

EXAMPLE 1

Crosslinking of Polyacrylonitrile Copolymer with Terephthalonitrile Bis(N-oxide)

A slurry of 5 g. of a powdered copolymer containing 93% acrylonitrile, 6% methyl acrylate and 1% styrene sulfonate (inherent viscosity, 1.5), in 50 ml. of dimethylformamide (DMF), was stirred at 50° C. until a water-white solution was formed. The solution was cooled to 25° C. and a slurry of 0.10 g. of terephthalonitrile bis(N-oxide) (TNO) in 6 ml. of DMF was added. The mixture was immersed in a 50° C. water bath and stirring was continued. After 20 minutes a firm crosslinked gel had formed. A 4.6-g. portion of the gel was diluted with 100 ml. of additional DMF and was found to be insoluble after being held at 25° C. for 15 hours.

EXAMPLE 2

Part 1

Crosslinking of Polyacrylonitrile Copolymer with Terephthalaldehyde Bis(chlorooxime) and Triethylamine A slurry of 5.0 g. of the polyacrylonitrile copolymer of Example 1 in 50 ml. of DMF was stirred at 50° C. until a water-white solution formed. It was cooled to 30° C. and 0.4 g. of terephthalaldehyde bis(chlorooxime) (TCO) was dissolved in the solution with stirring. The solution was stirred at 70° C. for 2.5 hours with no apparent change. Then 0.5 ml. of the weakly basic pyridine was added with no effect. When 0.5 ml. of the more strongly basic triethylamine was added, a very firm crosslinked gel formed within 20 seconds showing that it is necessary for a strong base to be present to convert TCO (*in situ*) to TNO.

Part 2

Curing of Polyacrylonitrile Copolymer Films with Terephthalaldehyde Bis(chlorooxime) and Triethylamine A solution of 10 g. of the polyacrylonitrile of Example 1, 0.2 g. of TCO, and 90 ml. of DMF was made up as in Example 2, Part 1, and used to cast several films, 15 mils in thickness. All films were air-dried for 30 minutes and then oven-dried for 1 hour at 70° C. These films were very brittle; for example, a 180° crease caused the film to crack.

(a) One of the dried films was stirred for 7 minutes at 85° C. in water containing a few drops of triethylamine. The film was then boiled in water for 5 minutes and dried at 70° C. in an oven. This crosslinked film was flexible and could be repeatedly creased to 180° without failing.

(b) A second dried film was boiled in water for 6.5 minutes, dried, heated in water-triethylamine for 7 minutes, water for 5 minutes, and dried. This crosslinked film was as flexible and tough as that of paragraph (a).

(c) A third dried film was boiled in water for 5 minutes and dried. This film was not crosslinked, and was as brittle as the originally cast film.

Part 3

Insolubility of Polyacrylonitrile Copolymer Films Crosslinked with TCO and Triethylamine A solution of 10 g. of the polyacrylonitrile copolymer of Example 1, 0.3 g. of TCO, and 90 ml. of DMF was used to cast three 15-mil films.

The films were treated as follows:

| Film: | Treatment |
|---|---|
| 1 | Air-dry 15 minutes, quench in water. |
| 2 | Air-dry 1 hour, quench in water. |
| 3 | Air-dry overnight. |

Each film was cut in half and one-half stirred in water at 60° C. for 10 minutes. The other half of each film was stirred in triethylamine-water (15 ml./liter) at 60° C. for 20 minutes and then water at 60° C. for 10 minutes. All films were then air-dried. A piece, about 1 cm. x 1 cm., of each half of films 1 and 3 was each tumbled for 90 hours at 25° C. in a vial containing 10 ml. of DMF. Each vial was poured into 500 ml. of rapidly stirred water. The films merely stirred in water were powdered whereas the films crosslinked by treatment with triethylamine-water remained intact.

Part 4

Effect of Triethylamine Hydrochloride on the Copolymer

Since triethylamine hydrochloride is formed as a by-product in the reaction of TCO with triethylamine to form TNO, the effect of the hydrochloride on the physical properties of a polyacrylonitrile film was evaluated. A solution of 10 g. of the polyacrylonitrile copolymer of Example 1, 0.2 g. of triethylamine hydrochloride and 90 ml. of DMF was used to cast a 15-mil film. The film was air-dried for 30 minutes, oven-dried for one hour at 70° C., boiled in water for 7 minutes and finally oven-dried. This film was as brittle as uncrosslinked films showing that triethylamine hydrochloride has no beneficial effect on the polymer.

EXAMPLES 3 AND 4

These Examples give physical property data of two acrylonitrile-containing copolymers crosslinked after formation of the bis(nitrile oxide) by reaction of N,N-dimethyl-N'-p-chlorophenylurea with the TCO precursor. Cure times and temperatures are given below. The copolymer of Example 3 is acrylonitrile/ethylene (25/75 wt. percent) and the copolymer of Example 4 is acrylonitrile/butyl acrylate.

| Example | 3 | 4 |
|---|---|---|
| Recipe (in parts): | | |
| Copolymer | 100 | 100 |
| Carbon black | 40 | 40 |
| Stearic acid | 1 | 1 |
| Phenylurea compound | 2 | 1 |
| TCO | 7 | 4 |
| Cure cycle | (¹) | (²) |
| Properties: | | |
| $T_B$ (p.s.i.) | 820 | 1,140 |
| $E_B$ (percent) | 350 | 190 |
| $M_{100}$ (p.s.i.) | 200 | 400 |
| Perm. set (break) | 32 | 3 |
| Hardness (ASTM D2240) | | 47 |
| Compression set (100° C./70 hrs.) | | 19 |

¹ 160° C./60 minutes.
² 160° C./90 minutes.

What is claimed is:

The embodiments of the invention in which an exclusive property or privilege is claimed are defined as follows:

1. A crosslinked polymer which comprises polymer having a molecular weight of about 5,000 to 2,000,000 and being derived 5 to 100 weight percent from monomer of the structure $$R^1R^3C=C(R^2)CN$$

wherein $R^1$, $R^2$ and $R^3$ are hydrogen; alkyl, alkoxy and alkylthio of 1 to 8 carbon atoms, alkoxycarbonyl of 2 to 8 carbon atoms; aryl and aryloxy of 6 to 12 carbons, acyloxy of 2 to 8 carbons, haloalkyl and cyanoalkyl up to 6 carbons; halogen, cyano, nitro and hydroxymethyl in which each polymer chain has at least three 1,2,4-oxadiazole crosslinking attachments of the structure

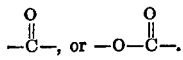

wherein R is alkylene, cycloalkylene, arylene, aralkylene, alkarylene, alkylene-diarylene, cycloalkylene, dialkylene, arylenedialkylene, alkylene-oxy-alkylene, arylene - oxy-arylene, alkylene-oxy-arylene, alkarylene-oxy-arylene, alkarylene-oxy-alkarylene and the corresponding thio and sulfonyl analogs; and X is zero, $$-\overset{O}{\underset{\|}{C}}-, \text{ or } -O-\overset{O}{\underset{\|}{C}}-.$$

2. A crosslinked polymer according to Claim 1 wherein said polymer is derived 5 to 100 percent by weight from acrylonitrile.

3. A crosslinked polymer according to Claim 2 wherein said polymer is a homopolymer of acrylonitrile.

4. A crosslinked polymer according to Claim 1 wherein said polymer is a homopolymer of 2-methylacrylonitrile.

5. A crosslinked polymer according to Claim 1 wherein said polymer is a homopolymer of 2-carboalkoxyacrylonitrile having alkyl groups of 1 to 6 carbon atoms.

6. A process for making the polymer of Claim 1 comprising reacting polymers derived from the monomer $$R^1R^3C=C(R^2)CN$$

with a nitrile oxide source selected from the group
bis(nitrile oxide),
bis(hydroxamoyl chloride), and
bis(hydroxamoyl chloride) and base,
at a temperature between about 40° C. and 175° C.

7. A process according to Claim 6 wherein the nitrile oxide source is a bis(nitrile oxide) selected from the group

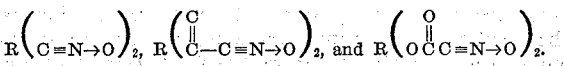

8. A process according to Claim 6 wherein the nitrile oxide source is a bis(hydroxamoyl chloride) selected from the group

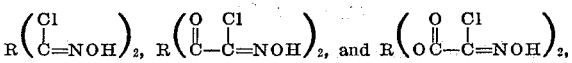

and a base selected from the group consisting of primary, secondary and tertiary amines, $R'_lNH_{3-l}$, where $l$ is an integer from 1 to 3, and
 $R'$, alike or different, is selected from alkyl of up to 8 carbons, and alkali and alkaline earth metal carbonates, hydroxides, alkoxides and carboxylates of alkyl aliphatic acids of up to 8 carbons.

9. A process according to Claim 6 comprising reacting the polymer with bis(hydroxyamoyl chloride) and N,N-dimethyl-N'-p-chlorophenylurea at a temperature above about 140° C.

10. A process according to Claim 6 comprising reacting the polymer with bis(hydroxyamoyl chloride) at a temperature above about 160° C.

References Cited
UNITED STATES PATENTS 3,027,357   3/1962   Stickle _____ 260—78.5

MURRAY TILLMAN, Primary Examiner

C. J. SECCURO, Assistant Examiner

U.S. Cl. X.R.

260—23 AR, 23 R, 41 R, 41 B, 80.81, 88.7 B